Nov. 30, 1954
C. L. COOK ET AL
2,695,734
FERTILIZER DISTRIBUTOR
Filed Feb. 23, 1950
3 Sheets-Sheet 1

INVENTORS
CURTISS L. COOK
AUSTIN E. YOUNG
BY
ATTORNEYS

Nov. 30, 1954  C. L. COOK ET AL  2,695,734
FERTILIZER DISTRIBUTOR
Filed Feb. 23, 1950  3 Sheets-Sheet 2

INVENTORS.
CURTISS L. COOK
AUSTIN E. YOUNG
BY
ATTORNEYS

Nov. 30, 1954  C. L. COOK ET AL  2,695,734
FERTILIZER DISTRIBUTOR
Filed Feb. 23, 1950  3 Sheets-Sheet 3
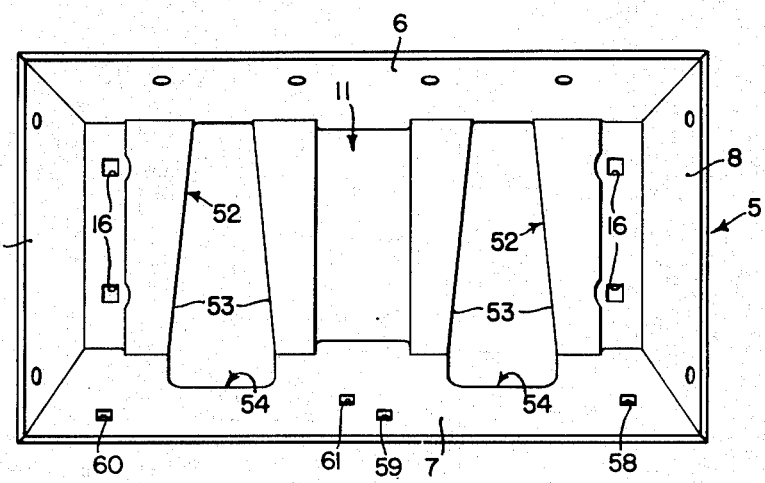
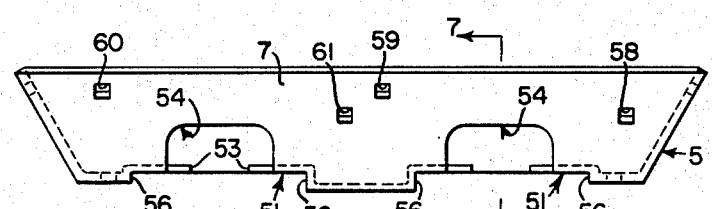
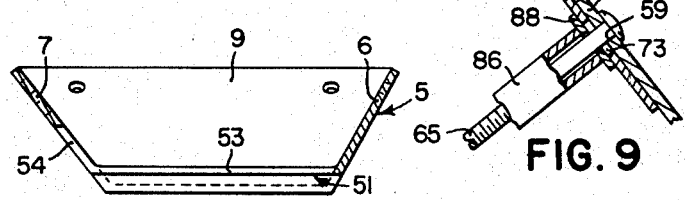
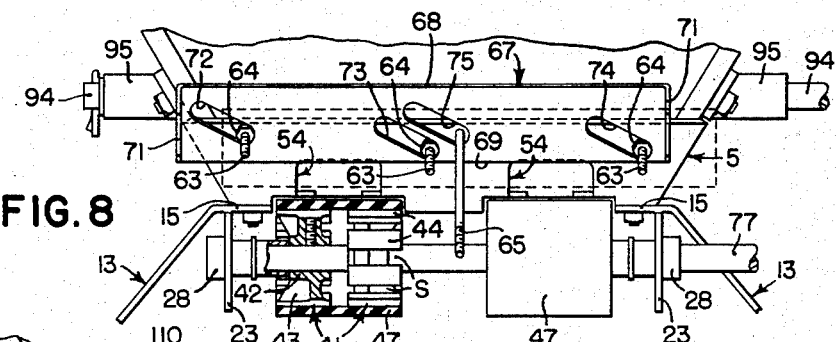
INVENTORS.
CURTISS L. COOK
AUSTIN E. YOUNG
ATTORNEYS

United States Patent Office 2,695,734
Patented Nov. 30, 1954

2,695,734

FERTILIZER DISTRIBUTOR

Curtiss L. Cook and Austin E. Young, Syracuse, N. Y., assignors, by mesne assignments, to Deere & Company, Moline, Ill., a corporation of Illinois Application February 23, 1950, Serial No. 145,782

12 Claims. (Cl. 222—310)

The present invention relates generally to agricultural machines and more particularly to machines for distributing fertilizer or the like.

The object and general nature of the present invention is the provision of a fertilizer distributor in which new and improved means affords a relatively wide range of adjustment of the rate of distribution. Further, it is a feature of this invention to provide a fertilizer distributor having endless belts for conveying the fertilizer from the hopper bottom to the point of discharge, and in which rotatable belt-supporting means of novel construction is utilized, the construction being such that accumulation of fertilizer and other material on the belt-supporting members is materially reduced.

Another feature of the present invention is the provision of new and improved spout and gate-supporting means which includes bolts carried by the hopper and in which the gate and/or the spouts may be removed without losing the bolts within the hopper bottom.

Still further, another feature of this invention is the provision of a new and improved hopper bottom construction in which the slot or slots through which the fertilizer moves in reaching the belt conveyor or conveyors are formed with diverging walls whereby there is a substantially unrestricted movement of the fertilizer with the conveyor belt or belts outwardly of the fertilizer hopper. Still further, another feature of this invention is the provision of a hopper construction embodying offset belt-receiving portions whereby the belts fit snugly underneath the associated discharge slots in the hopper.

These and other objects and desirable features of the present invention will be apparent by those skilled in the art after a consideration of the following detailed description, taken in conjunction with the accompanying drawings, in which:

Figure 5 is a top view, looking downwardly into the bottom section of the fertilizer hopper.

Figure 6 is a view of the front side of the hopper bottom shown in Figure 5.

Figure 7 is a sectional view taken along the line 7—7 of Figure 6.

Figure 8 is a view similar to Figure 3, showing the position of the gate to secure a maximum rate of discharge of the fertilizer.

Figure 9 is an enlarged sectional view taken along the plane of the line 9—9 of Figure 1.

Figure 10 is a fragmentary view, similar to Figure 3, showing a modified form of flow-controlling gate and gate support.

Figure 1:
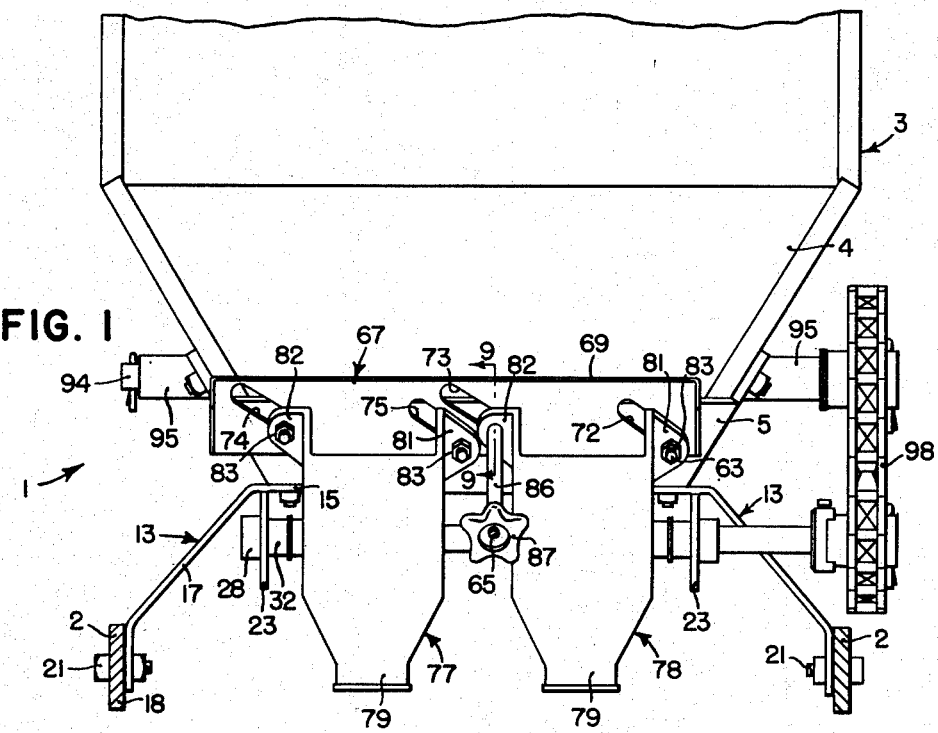
Figure 1 is a front view of a fertilizer attachment for potato planters or the like, in which the principles of the present invention have been incorporated.
Figure 2:
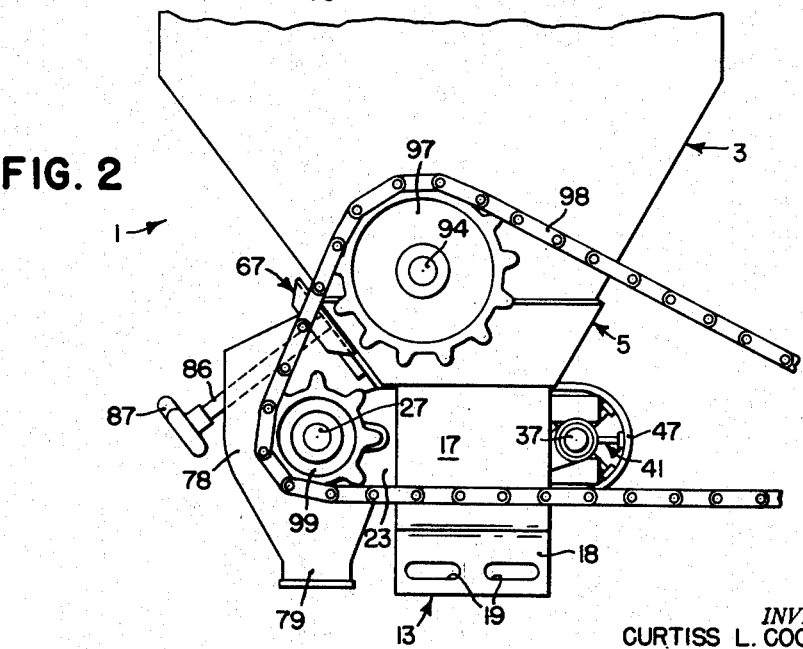
Figure 2 is a side view of the fertilizer attachment shown in Figure 1.

The fertilizer attachment in which the principles of the present invention have been incorporated is indicated in its entirety by the reference numeral 1 and generally is of the type shown in the United States Patent 2,091,432, issued August 31, 1937, to Curtiss L. Cook, being attachable to and supported on the frame of a potato planter. In Figure 1, the potato planter frame is shown as including two generally fore and aft extending frame bars 2. The fertilizer attachment includes a hopper 3, the lower portion of which is formed with downwardly converging walls 4 secured at their lower portions to a hopper bottom casting 5, the side and end walls 6, 7, 8 and 9 also converging downwardly and joined to a bottom wall 11, as best shown in Figure 5. The hopper 3 is supported on the frame bars 2 by means of a pair of brackets 13, each of which includes an upper section 15 to which the adjacent portion of the hopper bottom casting 5 is secured, as by bolts, extending downwardly through bolt holes 16 formed in the bottom wall 11, a downwardly and outwardly extending bracket section 17 and a lower vertical attaching section 18, the latter having bolt slots 19 by which each bracket is adjustably secured to the associated frame bar 2 by bolts 21. Each bracket 13 includes a longitudinally extending vertically disposed plate 23 welded at its upper end to the horizontal portion 15 of the associated hopper bracket 13, the plates 23 being apertured, as will be described in more detail later, to receive the shafts on which the belt-supporting rollers are mounted.

Figure 4:
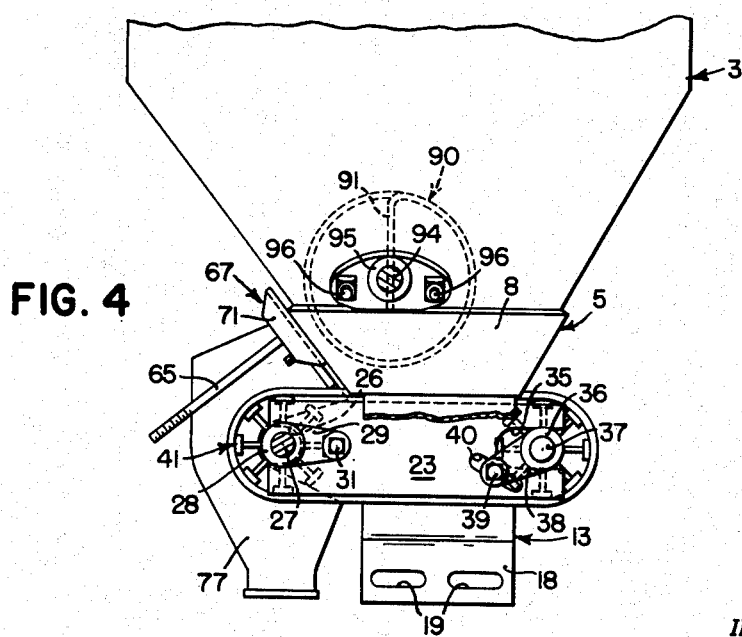
Figure 4 is a view similar to Figure 2, showing certain features of the belt feed for conveying fertilizer from the bottom of the hopper to the discharge spouts and past the flow-controlling gate.

As best shown in Figure 4, the forward end of each of the shaft-supporting plates 23 is provided with a forwardly facing U-shaped notch 26 in which the front roller shaft 27 is disposed, preferably by means of bearing members 28 which rotatably receive the shaft 27, each bearing member 28 being provided with an apertured ear 29 receiving a bolt 31 by which the bearing member 28 may be fixed in position on the bracket plate 23. Each bearing member 28 includes a hub portion 32 which is disposed in the associated notch 26. At the other end of each of the shaft-supporting plates 23 is a rearwardly facing notch 35 appreciably longer than the forward notch 26, and the longer notches 35 are adapted to receive the hub portions of the bearing members 36, which may be identical with the bearing members 28 described above, in which a rear roller shaft 37 is disposed. Apertured ears 38 on the bearing members 36 receive connecting bolts 39 which are adjustably fixed in slots 40 formed in the rear end of the shaft-supporting plates 23. The slots 40 are formed at such an angle that when the associated bolts 39 are loosened, the bearing members 38 may be shifted generally longitudinally of the plates 23 in the elongated slots 35, whereby the shaft 37 may be moved closer to or farther away from the forward shaft 27.

As best shown in Figures 4 and 8, the shaft 27 carries two pairs of wheels or rollers 41. Each wheel or roller 41 comprises a hub portion 42 disposed on the shaft 27, a plurality of radially extending finned spoke portions 43 terminating radially outwardly in slightly tapered segmental belt-engaging sections 44. The latter sections are formed so that there is a space s between the adjacent sections 44. The other shaft 37 carries the same number of wheels or rollers 41, and supported on the wheels or rollers 41 are two endless belts 47 which preferably are of like construction, the tension in the belts or conveyors 47 being secured and maintained by virtue of adjustment of the two rear shaft bearing members 36, as described above.

Referring now more particularly to Figures 5, 6 and 7, it will be seen that the bottom wall 11 of the hopper bottom 5 is provided with a pair of upwardly offset portions 51, in each of which is a slot 52 having edges 53 diverging toward fertilizer discharge openings 54 formed in the forward wall 7 of the hopper bottom 5. The hopper bottom 5 is formed so that each of the upwardly offset sections has opposite longitudinal edges 56 spaced apart substantially the same distance as the width of the associated conveyor belts 47. Similarly, the amount of vertical offset of the sections 51 is substantially the same as the thickness of the upper run of the associated fertilizer conveyor belt 47, as best shown in Figures 3 and 8.

Formed in the forward wall 7 of the hopper bottom 5 are two pairs of bolt holes 58, 59, 60 and 61. Disposed in the bolt holes 58, 60 and 61 are three bolts 63. Each of these bolts is adapted to be rigidly attached to the wall 7 by means of a nut 64. A centrally disposed elongated bolt 65, to which detailed reference will be made below, is disposed in the bolt hole 59 but the bolt 65 is not normally rigidly attached to the hopper bottom wall 7. Mounted for sliding movement on the nuts 64 is a flow-controlling gate 67. This member comprises an elongated part having upper and lower straight edges 68 and 69 and end lugs 71. The gate 67 is provided with two pairs of diagonally disposed slots 72, 73, 74 and 75, the slot 75 embracing the elongated bolt 65 while the other slots 72, 73 and 74 are slidable on the associated nuts 64.

Mounted on the bolts 63 and 65 is a pair of right- and left-hand spout members 77 and 78. The spout members 77 and 78 are preferably of identical construction, each including a discharge spout section 79 and a pair of apertured ears 81 and 82, the ears 81 and 82 of the right-hand spout member 77 being adapted to be mounted over the right-hand pair of bolts 63 while the apertured ears 81 and 82 of the left-hand spout section 78 are adapted to be mounted over the left-hand bolt 63 and the elongated bolt 65. Nuts 83 are threaded onto the bolts 63 and when tightened serve to rigidly fix the spout members 77 and 78 to the hopper bottom. The opening in the apertured ear 82 of the right-hand spout member 78 is enlarged to permit the inner end of a sleeve 86 to pass therethrough. The sleeve 86 is disposed on the elongated bolt 65 and a hand knob 87 is screwed onto the outer threaded end of the elongated bolt 65. Mounted on the bolt 65 at the inner end of the sleeve 86 is a washer 88 which when the hand knob 87 is tightened, serves to receive the inner end of the sleeve 86 and, acted on by the latter, serves thereby to clamp the portion of the gate surrounding the slot 75 against the adjacent portion of the hopper bottom wall 7, thereby locking the gate in the desired position of adjustment. When the hand knob 87 is loosened, the gate 67 is free to be moved generally laterally of the hopper, and by virtue of the diagonal disposition of the slots 72—75, the lower edge 69 (Figure 8) is moved downwardly to close off the upper portion of the fertilizer discharge openings 54, thereby controlling the amount of fertilizer drawn from the hopper by the upper runs of the belts 47 moving forwardly between the diverging walls 53 of the two hopper bottom slots 52.

Figure 3:
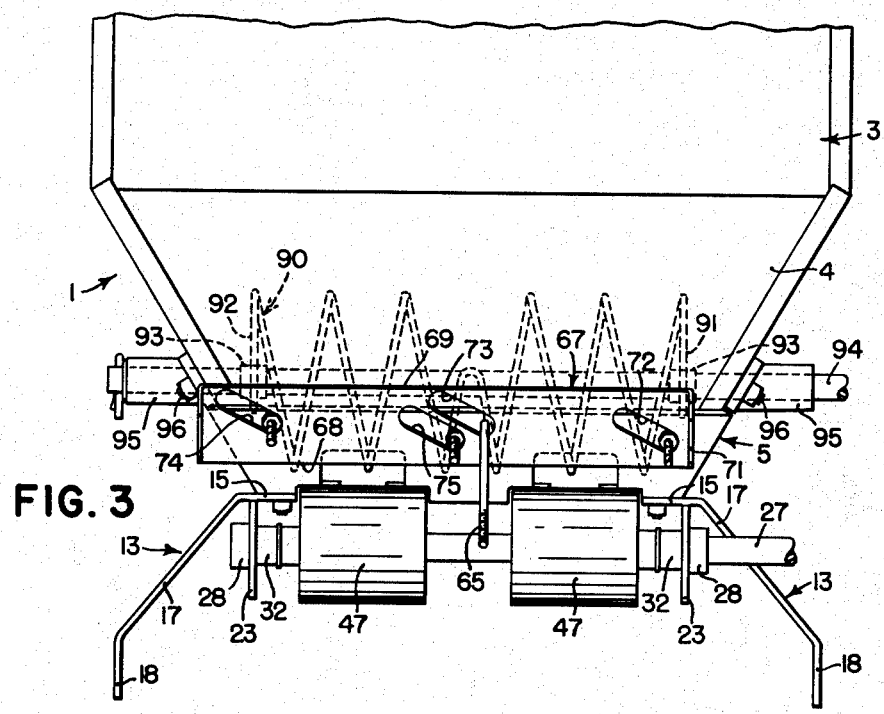
Figure 3 is a view similar to Figure 1, the discharge spouts and other parts being removed in order to show the flow-controlling gate construction somewhat more clearly than it is shown in Figure 1.

As indicated in Figure 3, the gate 67 may be reversed so that the edge 69 is uppermost and the edge 68 lowermost. All that it is necessary to do to reverse the gate 67 is to remove the nuts 83, together with the hand knob 87 and the sleeve 86, then the spouts 77 and 78 may be removed and the gate 67 lifted from the bolts 63 and 65 and reversed end to end and re-mounted on the bolts 63, 65. The spouts 77 and 78, nuts 83, sleeve 86 and hand knob 87, together with the washer 88, are then replaced, whereupon the gate 67 is mounted in the position shown in Figures 1 and 3, in which the edge 68, when the gate 67 is in its maximum discharge position for this range, closes off the upper portion of the openings 54. By moving the gate 67 to the right (Figure 3) on the nuts 64, the edge 68 may be brought down close to the belts 47, thereby providing for a minimum flow of fertilizer. Whether the gate 67 is in the position shown in Figure 3, which is the position for the range of smaller rates of flow, or in the position shown in Figure 8, in which the gate 67 is arranged to secure larger rates of flow, the gate 67 is held firmly and positively in any position of adjustment by tightening the hand knob 87.

Referring now to Figures 1 and 3, agitating means 90 is disposed within the hopper 3 and preferably comprises a double wound helix of spring wire secured at its ends 91 and 92 by clamps 93 of any suitable construction to an agitator shaft 94. The shaft 94 is disposed in bearing members 95 that are fixed by bolts 96 to the end walls of the hopper 3, and the shaft 94 carries a sprocket 97 around which a driving chain 98 is trained. The chain 98 also passes around a sprocket 99 fixed to the belt roller shaft 27, whereby the two shafts 27 and 94 are driven by power delivered thereto through the driving chain 98.

A modified form of the invention is shown in Figure 10. In this form of the invention the gate 110 is substantially the same as the gate 67 except that the slots 72a, 73a, etc., are disposed generally centrally of the gate. However, the latter is reversible, like the gate 67, and in order to secure the desired two ranges of fertilizer distribution, the edge 69a of the gate 110 is provided with an elongated notch 112 adapted to cooperate with the hopper bottom openings 54 to control the fertilizer distribution substantially the same as described above in connection with Figures 3 and 8.

In operation, in this form of the invention, when the gate 110 is mounted so that the notches 112 are on the lower side, the larger rates of fertilizer distribution are provided. For the smaller rates, the gate 110 is reversed, in the manner descibed above in connection with the gate 67, to bring the edge 68a into cooperation with the hopper bottom openings 54. Also, in this form of the invention, the bolt-securing nuts 64 (Figure 8) are eliminated and, instead, round bushings 113 are mounted on the bolts 63. This form of construction may be used whenever some other kind of means is employed to keep the bolts 63 from dropping into the inside of the hopper when the spouts 78 and 79 and associated parts are removed for the purpose of reversing the gate 110.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A fertilizer distributor comprising a hopper having a hopper bottom with an elongated slot having a discharge end terminating in a side wall of said hopper bottom, there being an opening in said wall which is an elongation of said discharge end of the slot to provide for a flow of material from the hopper through said opening, means operative along said slot for moving fertilizer material from said hopper through said slot, a gate adjustably mounted on the hopper and movable over said opening to different positions for varying the discharge of fertilizer through said opening, said gate having a pair of oppositely disposed flow-controlling edges, and means reversibly mounting said gate on said hopper in either of two positions relative to said opening so as to dispose either one or the other of said gate edges in operative position relative to said opening, thereby providing for two ranges of adjustment of said gate.

2. For use with a fetilizer distributor comprising a hopper having a discharge opening, the improvement which comprises control means including a gate having a pair of diagonal slots therein, a pair of bolt means adapted to be carried by the hopper to receive said slots, said gate being longer than said opening whereby adjustment of the gate by shifting the slotted portions of the latter along said bolt means serves to shift one edge of the gate in a direction to uncover more or less of said hopper opening, thereby varying the discharge of material therethrough, means on the bolt means thicker than the thickness of said gate for slidably receiving the slotted portions of and supporting said gate for slidable adjustment relative to the hopper opening, a spout disposable adjacent said opening, said spout having apertured ears receiving said pair of bolt means, and means on the latter for clamping the ears of said spout against said gate slot receiving means and thereby fixing said spout to the hopper while providing for movement of the gate into different positions of adjustment.

3. The invention defined in claim 2, further characterized by the gate-receiving means on said bolt means being nuts disposed in the gate slots and holding the bolt means in position on the hopper and providing for removal of said spout and/or said gate without losing the bolt means inside the hopper.

4. For use in a fertilizer distributor comprising a hopper including a generally rectangular hopper bottom having a slot extending transversely of the hopper bottom in laterally spaced relation, the wall of the hopper at the discharge end of said slot having an opening therein which is a continuation of said slot, and fertilizer discharge means movable generally horizontally underneath said slot for conveying fertilizer from the hopper outwardly through the associated hopper opening, the improvement comprising a discharge gate adapted to be mounted on the wall of the hopper having said opening, said gate having opposite edge portions, either of which is adapted to cover at least a portion of said opening, and means for reversibly mounting said gate on said hopper bottom so as to place one or the other of said edge portions in operative relation with respect to said hopper wall opening.

5. For use in a fertilizer distributor comprising a hopper including a generally rectangular hopper bottom having a slot extending transversely of the hopper bottom in laterally spaced relation, the wall of the hopper at the discharge end of said slot having an opening therein which is a continuation of said slot, and fertilizer discharge means movable generally horizontally underneath said slot for conveying fertilizer from the hopper outwardly through the associated hopper opening, the improvement comprising a discharge gate adapted to be mounted on the wall of the hopper having said opening, said gate having opposite edge portions, either of which is adapted to cover at least a portion of said opening, a pair of bolt means adapted to be carried by said hopper adjacent said fertilizer discharge opening, said gate having slots therein to receive said bolt means and said slots being angled whereby lateral movement of said gate relative to said bolt means serves to cause one edge or the other of said gate to uncover more or less of each of said opening, and means for reversibly mounting said gate on said hopper bottom, said slots being closer to one of said longitudinal edges than the other, whereby when said gate is reversed thereon from one position to another the position of the gate edge adjacent said opening is varied.

6. The invention defined in claim 5, further characterized by said bolt means including a pair of bolts, means on certain of said bolts and disposable in the associated slots of said gate for supporting the latter for sliding movement relative to the hopper, and means acting against the other of said bolts for clamping said gate in different positions of adjustment relative to said hopper.

7. The invention set forth in claim 6, further characterized by said other bolt being elongated and having its outer end threaded, a sleeve slidably disposed on said elongated bolt and bearing at its inner end against said gate, and means on the outer threaded end of said elongated bolt for forcing said sleeve into engagement with said gate for clamping the latter against the adjacent hopper wall for locking the gate in position.

8. A fertilizer distributor comprising a hopper having a hopper bottom with an elongated slot therein, an endless belt fertilizer conveyor disposed with its upper run in said slot, and a pair of rotatable members receiving and directly contacting the inner surface of said belt conveyor for supporting the latter, the belt-contacting portions of said members being generally smooth cylindrical peripherally interrupted sections, whereby the accumulation of fertilizer and other material on the cylindrical sections of said rotatable members is reduced.

9. A fertilizer distributor comprising a hopper having a hopper bottom with an elongated slot having a discharge end terminating in a side wall of said hopper bottom, there being an opening in said wall which is an elongation of said discharge end of the slot to provide for a flow of material from the hopper through said opening, means operative along said slot for moving fertilizer material from said hopper through said slot, a gate adjustably mounted on the hopper and movable over said opening to different positions for varying the discharge of fertilizer through said opening, said gate having a pair of oppositely disposed flow-controlling edges, and means reversibly mounting said gate on said hopper in either of two positions relative to said opening so as to dispose either one or the other of said gate edges in operative position relative to said opening, thereby providing for two ranges of adjustment of said gate, said hopper opening having upper and lower edges, said means for reversibly mounting said gate on said hopper including a slot in said gate, a pin connected to said hopper and disposed in said slot, said gate slot being disposed closer to one edge of the gate than the other edge, whereby two ranges of adjustment of said gate are provided, the lower edge of said gate, in either position, lying below the upper edge of said hopper opening.

10. A fertilizer distributor comprising a hopper having a hopper bottom with an elongated slot having a discharge end terminating in a side wall of said hopper bottom, there being an opening in said wall which is an elongation of said discharge end of the slot to provide for a flow of material from the hopper through said opening, means operative along said slot for moving fertilizer material from said hopper through said slot, a gate adjustably mounted on the hopper and movable over said opening to different positions for varying the discharge of fertilizer through said opening, said gate having a pair of oppositvely disposed flow-controlling edges, and means reversibly mounting said gate on said hopper in either of two positions relative to said opening so as to dispose either one or the other of said gate edges in operative position relative to said opening, thereby providing for two ranges of adjustment of said gate, said hopper opening having upper and lower edges, said means for reversibly mounting said gate on said hopper including a plurality of slots in said gate, a plurality of pins connected to the hopper and disposed, respectively, in said slots, said gate slots being disposed closer to one edge of the gate than the other edge, whereby two ranges of adjustment of said gate are provided, the lower edge of said gate, in either position, lying below the upper edge of said hopper opening.

11. The invention set forth in claim 10, further characterized by means on certain of said pins for holding said gate on said pins with sufficient looseness to accommodate movement of the gate relative thereto, and means on another of said pins for clamping the gate to the hopper in selected position.

12. For use with a fertilizer distributor comprising a hopper having a discharge opening, the improvement which comprises control means including a gate having a pair of diagonal slots therein, a plurality of members adapted to be carried by the hopper to slidably receive said slots, means on certain of said members to hold said gate thereon while accommodating sliding movement of the gate relative to said members, said gate being longer than said opening whereby adjustment of the gate by shifting the slotted portions of the latter along said members serves to shift one edge of the gate in a direction to uncover more or less of said hopper opening, thereby varying the discharge of material therethrough, a spout disposable adjacent said opening, means fixedly mounting said spout on said certain gate-receiving members, whereby the latter serve to hold said spout on said hopper, and clamping means on one of the other members engageable with the gate for fixing it in any position of adjustment.

References Cited in the file of this patent

UNITED STATES PATENTS

| Number | Name | Date |
|---|---|---|
| 15,640 | Beecher | Sept. 2, 1866 |
| 149,175 | Williams | Mar. 31, 1874 |
| 353,436 | Andrus | Nov. 30, 1886 |
| 493,146 | Bender | Mar. 7, 1893 |
| 536,337 | Gundlach | Mar. 26, 1895 |
| 694,069 | Noechel | Feb. 25, 1902 |
| 716,769 | Seaver | Dec. 23, 1902 |
| 745,903 | Ploss | Dec. 1, 1903 |
| 1,198,796 | Wallace | Sept. 19, 1916 |
| 1,234,532 | Dickerson | July 24, 1917 |
| 1,300,441 | Marsa | Apr. 15, 1919 |
| 1,466,835 | Jennings | Sept. 4, 1923 |
| 1,614,378 | Micka | Jan. 11, 1927 |
| 1,908,882 | Berkenbeuel | May 16, 1933 |
| 2,036,522 | Armstrong | Apr. 7, 1936 |
| 2,091,432 | Cook | Aug. 31, 1937 |
| 2,311,726 | Blue | Feb. 23, 1943 |
| 2,316,310 | Bliss | Apr. 13, 1943 |